July 27, 1965

J. DIAZ-COMPAIN 3,197,336

CLARIFIERS AND SEPARATORS

Filed Dec. 14, 1962

INVENTOR
JERONIMO DIAZ-COMPAIN

BY
*Fred C. Philpitt*

ATTORNEY

July 27, 1965  J. DIAZ-COMPAIN  3,197,336
CLARIFIERS AND SEPARATORS
Filed Dec. 14, 1962  3 Sheets-Sheet 2

INVENTOR
JERONIMO DIAZ-COMPAIN

BY
Fred C. Philpitt
ATTORNEY

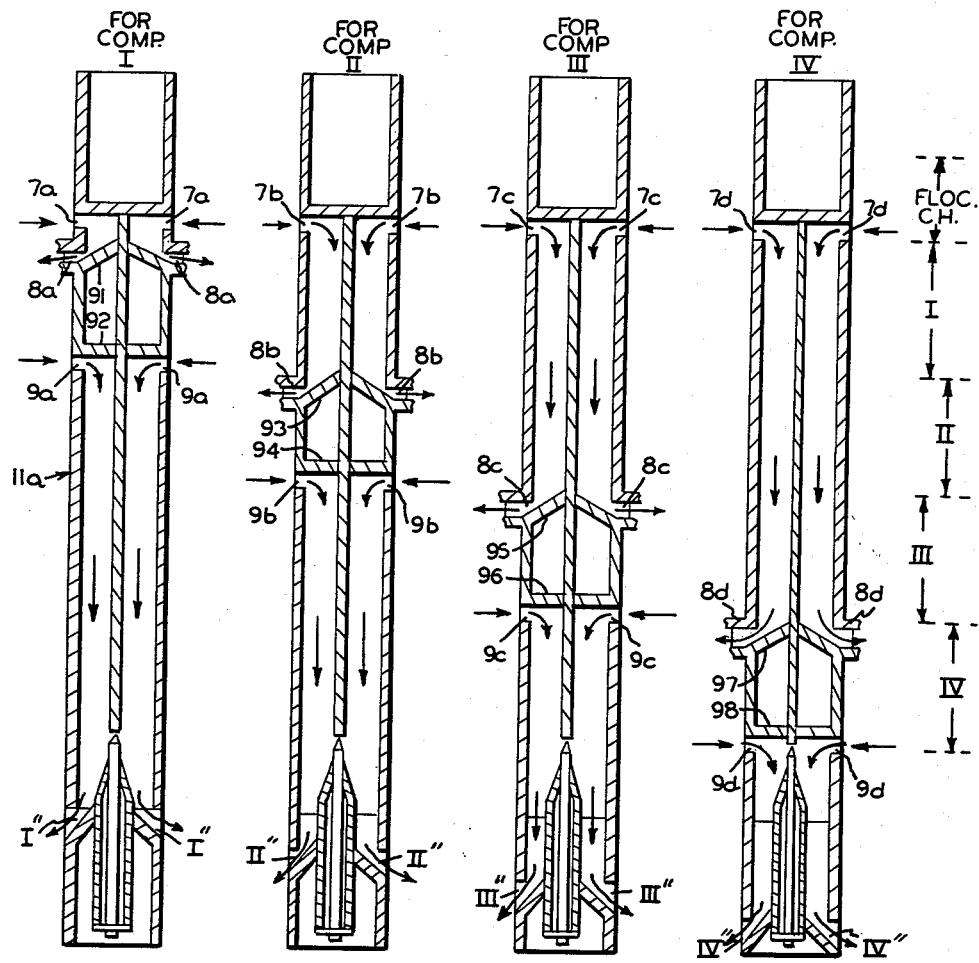

United States Patent Office 3,197,336
Patented July 27, 1965

3,197,336
CLARIFIERS AND SEPARATORS
Jeronimo Diaz Compain, P.O. Box 370, New York, N.Y.
Filed Dec. 14, 1962, Ser. No. 244,690
10 Claims. (Cl. 127—13)

This invention generally pertains to an improved method and apparatus for clarifying liquids by sedimentation and decantation. More specifically the present invention relates to an improved method and apparatus for clarifying liquids containing flocculated suspensions and is well adapted for use in the clarification of sugar cane juice, and in the clarification of juices and liquids from which solids are separated in the manufacture of beet sugar, but the invention may be used for other clarifying purposes.

The objects and advantages of the present invention can perhaps best be summarized by the following list of advantageous features which either singly or in various combinations are characteristic of the apparatus and methods of my invention:

(1) increased clarification efficiency and increased clarification capacity;

(2) increased settling speed of the liquids under treatment;

(3) it permits a division into different levels to be made of the unstable horizontal dividing areas formed by low density cloudy juices and mud which ordinarily act as a blanket or upward sludge filtration within the clarification process;

(4) the division set forth in (3) shortens the distance the clarified juices must travel to the drain-off pipe for their removal;

(5) permits each and every one of the compartments or trays of which clarifiers are formed to operate completely separately, and to draw off the mud continuously if necessary;

(6) permits separate regulation of the withdrawal of clarified liquid and/or thickened liquids (or "mud") from each compartment;

(7) permits each compartment in a multi-compartment clarifier to operate completely independently of other compartments;

(8) permits continuous withdrawal of mud, if desired;

(9) permits any one of the compartments or trays to be isolated and cleaned out without such operations interfering with the other compartments;

(10) minimizes the oppoortunity of the mud to ferment because of the very rapid way in which the mud is removed from the various compartments and from the clarifier as a whole;

(11) minimizes the undesirable generation of fermentation gases which, by their sudden explosion within the mass of the juices, can cause undesirable agitation and turbulence and retard settling;

(12) minimizes losses due to inversion;

(13) saccharine juices are clean and of great brilliance.

These, as well as other objects and advantages of my invention, will be better understood after reading the following description in conjunction with the drawings, wherein:

FIGURES 6–9 are fragmentary cross sectional views of the central tubular element shown in FIGURE 4 illustrating the flow pattern of liquids and solids.

In a broad sense my invention relates to a clarifier, thickener, separator or the like comprising in combination:

(a) a plurality of superposed clarifying compartments, (b) at least one inlet into each compartment for the introduction of liquid feed material, (c) clarified liquid withdrawal means in each compartment, (d) a mud collection section adjacent the lower central portion of each of said clarifying compartments, (e) a vertical rotatable tubular element extending centrally upwardly through said plurality of clarifying compartments, in such a manner that there is no substantial flow of material between adjacent compartments, (f) said tubular element being operatively connected to means for rotating it, (g) the interior of said tubular element being divided into a number of separate vertically extending channels corresponding to the number of compartments, (h) each of said separate vertically extending channels having an upper intake gateway in the outer wall of said tubular element for the downward passageway of mud from said mud collection sections, (i) each of said channels also having a separate lower discharge opening in the outer wall of said tubular element of the discharge of mud, (j) each of said discharge openings in said tubular element being in open communication with a separate discharge conduit for conveying away the mud material discharged from each channel.

Figure 1:
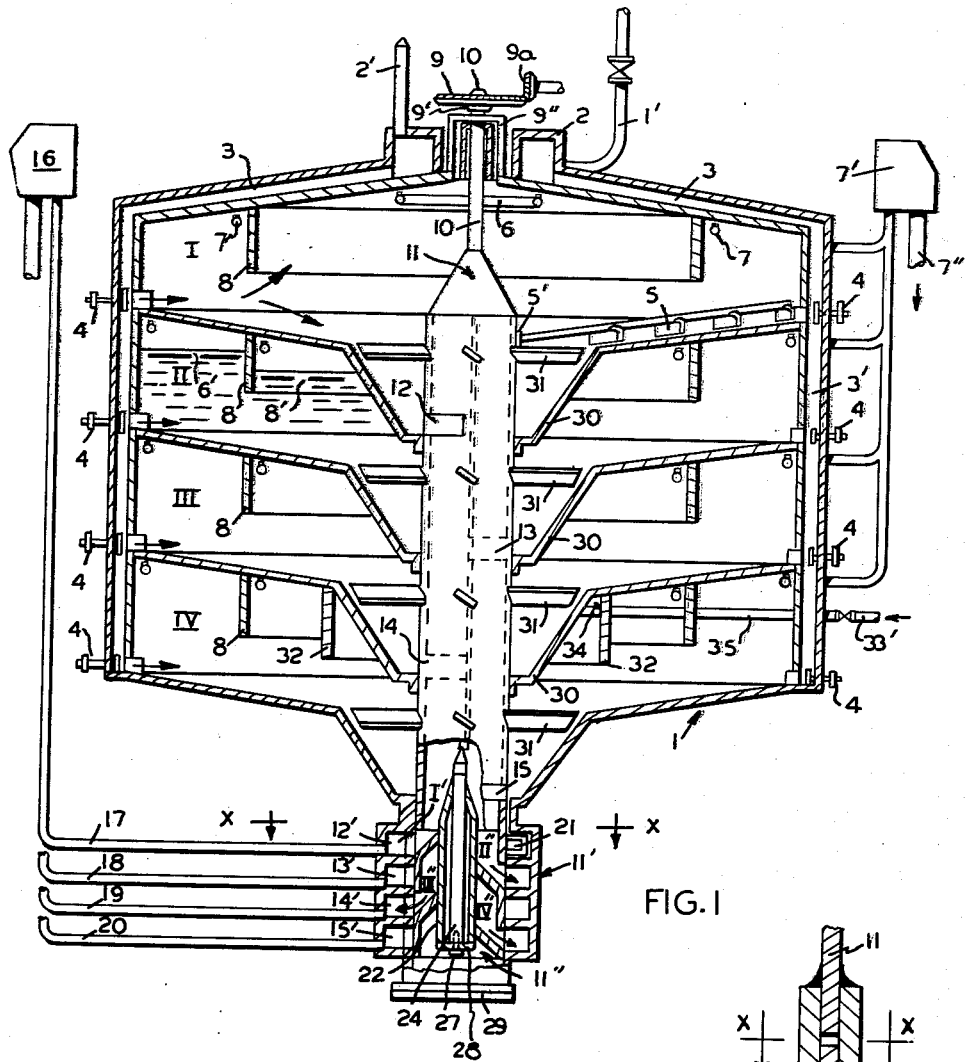
FIGURE 1 is a sectional view of a first embodiment of an apparatus in accordance with my invention.

It is believed that the invention will now be understood in specific terms by referring to FIGURE 1.

(a)

The exterior housing 1 of the clarifier is seen to comprise compartments I, II, III and IV, although it will be appreciated that a greater or smaller number of compartments may be employed.

(b)

Each compartment perferably has at least one inlet for the introduction of liquid feed material. In FIGURE 1 these inlets are shown as comprising a plurality of valued inlets 4 located at spaced points around the outer perihery of each compartment. As shown, valved inlets 4 are fed by downwardly extending feed channels 3' that are in turn fed by feed channels 3 which extend radially outwardly from a main inlet header 2. Header 2 has a vent pipe 2' and header 2 is in turn fed by a main feed pipe 1'.

The inlets need not be on the outer periphery of each compartment. This is illustrated in compartment IV of FIGURE 1, wherein it is shown that the liquid feed enters pipe inlet means 33', 35 and 34 and can flow from the center of the compartment (at a point inward of baffle 32) toward the periphery of the compartment. When such an inlet arrangement is employed channels 3 and valved inlets 4 are of course not needed.

(c)

It will be understood that in each compartment the liquid material introduced through valved inlets 4 will tend to separate into an upper clarified juice layer and a lower sludge layer. Accordingly at least one conduit must be provided in each compartment for withdrawing the clarified juice layer. It is frequently desirable to use several conduits for this purpose. Such conduits work best if they are located near the topmost portion of each compartment.

The separation of the clarified juice and sludge layers is generally facilitated (particularly when the diameter of a compartment is large) by the use of one or more baffles in each compartment. Such baffles in effect create subcompartments within each compartment. Such baffles cause vertical staggering of the interface (often poorly defined) between the upper clarified juice layer and the lower sludge layer. Thus in compartment II of FIGURE 1, it will be observed that interface 6' is vertically staggered (above) with respect to the interface 8'. The relative levels of these interfaces can be easily controlled by the rate of withdrawal of the clarified juices. The aforesaid baffles in effect compensate for the slope of the horizontally extending partitions between adjacent compartments. Vertical circular baffles 8 are shown in FIGURE 1 which depend downwardly from the top of each compartment to a point intermediate the top and bottom of each compartment. Two or more radially spaced baffles can be employed if desired (e.g. see baffles 8 in compartment IV of FIGURE 1).

Draw-off pipes 6 and 7 for the clarified juices are shown. Although not shown in detail, pipe 6 (as well as pipe 7) carry the clarified juices to an overflow box 7', whereafter they can be discharged to storage or another operation (e.g. an evaporator) by means of pipe 7''.

The withdrawal means or outlets need not be located at any particular position with respect to the inlets. In this regard compartment IV of FIGURE 1 is to be contrasted with other compartments, because in compartment IV the juice introduced passes downwardly and outwardly, and if the juices flow at not more than 50 feet per hour, an initial settling will take place, as verified by the operation of Dubnat's law, under which the supporting principle of moving liquids with velocities above 50 feet per hour will hold finely divided particles in suspension. It is thus possible and natural for the greater part of the solids to precipitate and settle in the area limited by the surface over funnel or cone 30.

(d)

Each compartment preferably has a mud collection section. This mud collection section is most desirably located adjacent the lower central portion of each clarifying compartment. As noted previously, after the liquids are introduced through valved inlets 4, the sludge tends to settle. Each compartment of the clarifier is equipped with a mud rake arrangement 5, fixed at 5' to central rotating tubular element 11. This mud rake arrangement functions to move the mud or solids from the outer peripheral portions of each compartment toward the center of each compartment. (Mud rakes have not been shown in compartments II, III and IV in order to avoid duplication and unnecessary complexity in the drawings—but it will be understood that such rakes are intended to be in each compartment.)

The mud will collect in the central portion of each compartment, and particularly with reference to FIGURE 1, within that portion bounded by the sharply sloping cone-like portion 30 of the bottom of each compartment. The mud is of higher density within cone sections 30 and paddles 31 are desirable in order to move the mud.

(e)

A vertical tubular element extends centrally upwardly through said plurality of clarifying compartments. Such an element is shown as 11 in FIGURE 1 and it is preferably of circular cross-section. It is preferred that said tubular element be mounted with respect to said compartments so that there is no substantial flow between adjacent compartments. This is obviously desirable, since otherwise the function of each compartment as a settling chamber would be largely lost. Flow restriction can usually be easily accomplished by careful machining and fitting of parts and if desired packing, gaskets, or the like.

(f)

The tubular element 11 has an upper shaft extension 10, which extends through the top of the clarifier and to which is attached a gear 9. Immediately below gear 9 is a ball bearing arrangement 9' that is supported by a pedestal 9''—and it is this arrangement which carries the weight of tubular element 11 and its attached parts. Gear 9 is driven by gear 9a.

(g)

The interior of the tubular element is divided into a number of separate vertically extending channels, preferably corresponding to the number of compartments. In other words, the tubular element contains within it the vertically extending channels I', II', III' and IV' (see FIGURE 2). These channels do not communicate with each other. Although only 4 channels are shown in FIGURE 1 a greater or lesser number could be used if desired. Rather than having the number of channels correspond to the number of compartments, the number of channels could be even multiples of the number of compartments (such as two or three times the number of compartments).

(h)

Each of said aforesaid channels is provided with an upper intake gateway in the outer wall of the tubular element so as to permit downward passageway of mud or sludge from the mud collection section immediately adjacent to each gateway. If there are four compartments and four channels, then each channel will have an intake gateway at a different level as is indicated by gateways 12, 13, 14 and 15 in FIGURE 1. A given channel would not have intake gateways communicating with two or more compartments. The said intake gateways are preferably located adjacent the very bottom of each compartment and in particular adjacent the very bottom of the mud collection section of each compartment. Paddles 31 serve to move or push the mud or solids toward the inlet gateways 12–15.

(i)

Each of the aforesaid channels also is provided with a separate lower discharge opening in the outer wall of said tubular element. These openings are designed to discharge the mud or sludge which has passed downwardly through said channels. As shown in FIGURE 1 these discharge openings are each at a different level and all of them open into a large multi-section stationary discharge manifold 11'. The path of discharge through the said openings is indicated by arrows I'', II'', III'' and IV''.

(j)

Each of the aforesaid discharge openings in the lower portion of said tubular element 11 is arranged so that it is in open communication with a separate discharge conduit for conveying away the mud material discharged from each of the channels I', II', III' and IV'. With specific reference to FIGURE 1, the discharge opening for channels I', II', III' and IV' are seen to be in open communication with separate sections 12', 13', 14' and 15' respectively of the stationary discharge conduit manifold 11'. Sections 12', 13', 14' and 15'; are in turn in open communication with separate discharge conduits 17, 18, 19 and 20 respectively which preferably all lead to a box 16 which may be associated with pumps for withdrawing mud through said conduits. By way of example then, it will be seen that the mud settling in compartment I would enter intake gateway 12, pass downwardly through channel I', exit through the discharge opening for channel I' (as indicated by arrow I'') and then enter section 12' of the stationary discharge manifold 11' before exiting through discharge conduit 17 to box 16.

Sections 12', 13', 14' and 15' in effect comprise essentially circular ducts disposed around the lower portion of tubular element 11. Each of these sections is swept by a blade or scraper means 21 attached to the lower exterior surface of tubular element 11 and this action serves to facilitate removal of the mud and prevent mud adhesion to the walls of the said sections. The scrapers 21 of course only rotate when the tubular element 11 rotates.

Manifold 11' does not rotate, and is preferably welded or otherwise attached below the lower portion of compartment IV.

Figure 2:
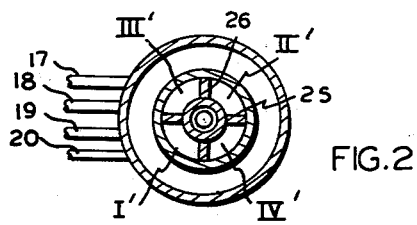
FIGURE 2 is a view along X—X of FIGUGE 1.

The tubular element 11, with its various inlets, channels, openings, scrapers, etc., can be built in a number of different ways, all of which will be apparent to those skilled in the art. For ease of repair and maintenance, the tubular element 11 is preferably made in two sections, the lower section being generally below line X—X in FIGURE 1 and the upper section above line X—X. FIGURE 2 is a view along X—X of FIGURE 1, showing a central shaft 24 which is welded or fixed at the intersection of plates 25 and 26 (which between them form channels I', II', III' and IV'). Shaft 24 has a bolt 27 which is used to join the lower section of the tubular element to the upper section. For example, with reference to the lower element, the member 11" is completely independent of the upper part of element 11. Member 11" comprises a tube 22, having an integral cone 23 which is adapted to fit around shaft 24. Bolt 27 holds cover 28 and the above-mentioned portions of 11" on shaft 24. Preferably, cover 28 joins member 11" to rotational element 11 precisely at line X—X. When once so joined, the member 1" is moved or rotated by element 11. Manhole 29 gives access to bolt 27 when desired, and after bolt 27 is loosened and removed the entire lower member 11" can be removed for inspection or repair.

Figure 3:
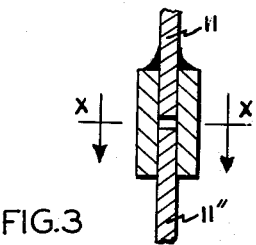
FIGURE 3 is a detailed fragmentary view of a joint construction useful in connection with my invention.

FIGURE 3 is an enlarged fragmentary sectional view showing the juncture between the upper member 11 and the lower member 11" at approximately the point X—X.

The construction minimizes leakage of the mud and assists as a guide in properly aligning the upper and lower portions of the tubular element.

Figure 4:
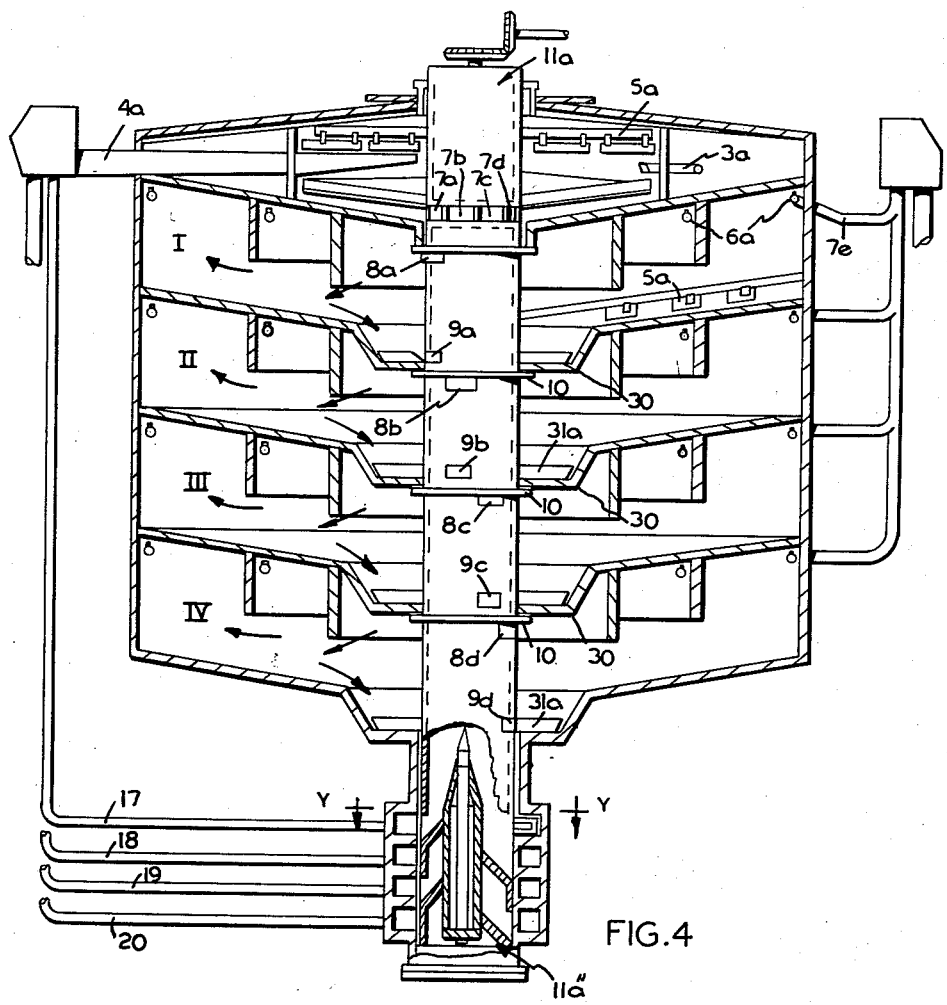
FIGURE 4 is a sectional view of another embodiment of my invention.

FIGURE 4 illustrates another embodiment of the basic concept of the present invention which has permitted 30 percent more capacity due to the fast removal of mud and an 80 percent reduction in inversion losses. Essentially, this embodiment involves the concept of both introducing the liquid feed material centrally and withdrawing the mud product centrally so that there is, to at least a limited extent, a countercurrent flow of the liquid feed and the mud product. Referring now to FIGURE 4, the liquid feed is introduced through a main inlet 3a in a chamber at the top of the clarifier. In this upper chamber, which may be considered as a preliminary skimming and flocculation chamber, a certain amount of the froth from the introduced liquid can be removed by means of skimming channel 4a. The skimming mechanism or blades 5a may also be utilized to facilitate this operation. A central rotating tubular element 11a is shown generally corresponding to tubular element 11 of FIGURE 1 (the drive means for the tubular element 11a has not been shown since it is essentially the same). The control element 11a passes downwardly through compartments I, II, III and IV as was the case with FIGURE 1. The main difference is the flocculating chamber disposed above said compartment and the fact that all of the inlet liquid is introduced initially into said flocculating chamber. Rings 10 are also provided on the exterior surface of 11a to help support truncated cone members 30.

Near the bottom of said flocculating chamber and centrally thereof the tubular element 1a is provided with a plurality of inlets 7a–7d. (Actually only four of these inlets are shown in FIGURE 4 but it will be understood that there are four corresponding units on the back-side of the tubular element 11a.) Each of the inlets 7a–7b lead to openings in compartments I, II, III and IV. For instance, inlet 7a leads to opening 8a of compartment I, 7b to opening 8b, opening 7c to opening 8c and opening 7d to opening 8d. In other words, the liquid feed in the top chamber, after preliminarily having some froth removed, will pass downwardly through the tubular element 11a in a plurality of separate streams and each stream will exit into the upper part of one of the compartments I–IV. As indicated by the arrows in the various compartments I–IV, the liquid feed introduced through openings 8a–8d will travel outwardly toward the periphery of the clarifier. However, as the mud is deposited on the bottom of each compartment it will gravitate toward the center of the clarifier by virtue of the inwardly sloping bottom wall of each compartment. Each compartment is also provided with at least one mud outlet opening 9a–9d which permits the mud to pass out of the compartment and downwardly through the central tubular element 11a to the discharge manifolds described previously in relation to FIGURE 1.

Figure 5:
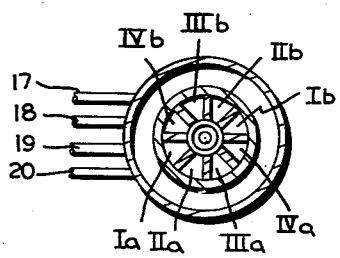
FIGURE 5 is a view along Y—Y of FIGURE 4.

The mud withdrawal means for lower portion of element 11a (below Y—Y") is substantially identical in operation and construction with the portion below X—X in FIGURE 1. Similarly the details of the top driving means 11a have not been shown. However the view along Y—Y of 11"a as seen in FIGURE 5 is to be contrasted with FIGURE 2 insofar as the number of channels is concerned. It should be noted that with the embodiment of the invention shown in FIGURE 4 the same vertical channel in the tubular element is used for the introduction of feed to a compartment and the removal of mud from that compartment. Thus dual-functioning channel is made possible by blocking off certain portions of each vertical channel with channel blocking members (91–98).

The flow through the various compartments, channels and openings of the apparatus shown in FIGURE 4 is diagrammatically illustrated in FIGURES 6–9. The portions of tubular element 11a are seen to contain a plurality of sealed off sections (i.e. between 91–92, 93–94, 95–96 and 97–98) that in effect form buoyant chambers which reduce the weight of the central rotating element.

In conclusion, while there have been illustrated and described several preferred embodiments of my invention, it is to be understood that since the various details of construction may obviously be varied considerably without really departing from the basic principles and teachings of this invention, I do not limit myself to the precise constructions herein disclosed and the right is specifically reserved to encompass all changes and modifications coming within the scope of the invention as defined in the appended claims. Having thus described my invention, what I claim as new and desire to secure a United States Letters Patent for is:

What is claimed is:

1. A clarifier, thickener, separator or the like comprising in combination:
   (a) a plurality of superposed clarifying compartments,
   (b) at least one inlet into each compartment for the introduction of liquid feed material,
   (c) clarified liquid withdrawal means in each compartment,
   (d) a mud collection section adjacent the lower central portion of each of said clarifying compartments,
   (e) a vertical rotatable tubular element extending centrally upwardly through said plurality of clarifying compartments, in such a manner that there is no substantial flow of material between adjacent compartments,
   (f) said tubular element being operatively connected to means for rotating it,
   (g) the interior of said tubular element being subdivided into a number of separate vertically extending channels corresponding to a multiple of the number of compartments,
   (h) each of said separate vertically extending channels having an upper intake gateway in the outer wall of said tubular element for the downward passageway of mud from said mud collection sections,
   (i) each of said channels also having a separate lower lateral discharge opening located in the lower outer side wall portion of said tubular element for the discharge of mud,
(j) the plurality of lower lateral discharge openings in the lower outer side wall portion of said tubular element being located at different levels with respect to each other,
(k) said plurality of lower lateral discharge openings in the lower outer side wall portion of said tubular element being surrounded by a stationary annular manifold comprising a plurality of discharge conduits,
(l) the plurality of discharge conduits in said stationary annular manifold being located at different levels with respect to each other,
(m) said plurality of lower lateral discharge openings in the lower outer side wall portion of said tubular element being aligned with said plurality of discharge conduits in said annular manifold so that each discharge opening is in open communication with a different discharge conduit.

2. The clarifier of claim 1 wherein the lower exterior portion of said tubular element is provided with scraper means that extend partially into the plurality of discharge conduits in said stationary annular manifold.

3. The apparatus of claim 1 wherein said inlets into each compartment for the introduction of liquid feed material are located adjacent the periphery of each compartment.

4. The apparatus of claim 1 wherein said inlets into each compartment for the introduction of liquid feed material are located near the central portion of each compartment.

5. The apparatus of claim 1 wherein the lower portion of said tubular element which contains said lateral discharge openings being separable from the remaining portion of said tubular element.

6. The apparatus of claim 1 wherein at least one downwardly depending baffle means is located within each of said compartments.

7. The apparatus of claim 6 wherein an outlet for the withdrawal of clarified juice is located adjacent the top of each subcompartment created by said baffle means.

8. The apparatus of claim 1 wherein a flocculation chamber containing a main liquid feed inlet is disposed above the uppermost of said compartments.

9. The apparatus of claim 8 wherein the inlets into each compartment for the introduction of liquid feed material are located in said tubular element and are in open communication with upper openings in said tubular element, said upper openings in said tubular element being positioned within said flocculation chamber.

10. The apparatus of claim 8 wherein both said inlet for the introduction of liquid feed material and said upper intake gateway are located in said tubular element.

References Cited by the Examiner
UNITED STATES PATENTS

| | | | |
|---|---|---|---|
| 1,135,997 | 4/15 | Dorr | 127—13 X |
| 2,253,878 | 8/41 | Weber | 210—522 X |
| 2,479,126 | 8/49 | Lipscomb | 210—522 X |
| 2,599,782 | 6/52 | Rodriguez | 210—522 X |

MORRIS O. WOLK, *Primary Examiner.*